United States Patent [19]
Yada et al.

[11] Patent Number: 5,193,876
[45] Date of Patent: Mar. 16, 1993

[54] AUTOMOBILE WINDSHIELD MOLDING

[75] Inventors: Yukihiko Yada; Tosikazu Ito, both of Nagoya, Japan

[73] Assignee: Tokai Kogyo Kabushiki Kaisha, Ohbu, Japan

[21] Appl. No.: 799,957

[22] Filed: Nov. 29, 1991

[30] Foreign Application Priority Data

Nov. 30, 1990 [JP] Japan .............................. 2-126582[U]
Dec. 7, 1990 [JP] Japan .............................. 2-402128[U]

[51] Int. Cl.[5] ........................................... B60J 10/02
[52] U.S. Cl. ...................................... 296/93; 296/208
[58] Field of Search ................. 296/93, 200, 201, 208, 296/213

[56] References Cited

U.S. PATENT DOCUMENTS

| | | | |
|---|---|---|---|
| 4,757,660 | 7/1988 | Miyakawa et al. | 296/93 X |
| 4,833,847 | 5/1989 | Inayama et al. | 296/93 X |
| 5,035,459 | 7/1991 | Yada | 296/93 |
| 5,104,173 | 4/1992 | Tamura et al. | 296/93 |

Primary Examiner—Charles A. Marmor
Assistant Examiner—Andrew C. Pike
Attorney, Agent, or Firm—Oblon, Spivak, McClelland, Maier & Neustadt

[57] ABSTRACT

An automobile windshield molding includes a leg portion whose height is increased at a side molding part, and a sub-molding member attached to the leg portion of the side molding. At the side molding part, the sub-molding member, and the leg portion and an inward wing of the molding define a space to be used as a water drain channel.

2 Claims, 15 Drawing Sheets

AUTOMOBILE WINDSHIELD MOLDING

BACKGROUND OF THE INVENTION

1. Field of the Invention:

This invention relates to a windshield molding which is installed in the space between a window opening of vehicle body panels and a windshield fastened to the vehicle body panels.

2. Description of the Related Art:

A windshield molding is usually attached around a peripheral edge of a windshield to seal the space between the windshield and a window opening of vehicle body panels. The windshield molding (called "molding" hereinafter) is a strip-like member manufactured by the extrusion process, being attached to the vehicle body panels and around the windshield with or without a fastener. In the latter case, the fastener is attached to the vehicle body panels beforehand to receive part of the molding therein.

Japanese Patent Laid-Open Publications 244820/1989 and 269612/1989 exemplify a molding which is installed in the space between the windshield and the vehicle body panels without using the fastener.

In the former case, an extruded strip-like molding has two grooves on its side surface. One of members defining the grooves is removed at a portion associated with the upper edge of the windshield. At the corner portion, the molding is elastically reshaped so that the groove for receiving the upper edge of the windshield is merged with the groove for the side edge of the windshield. The remaining groove associated with each pillar panel serves as a water drain channel.

Since it has a uniform shape, the foregoing molding cannot be attached to vehicle body panels having a continuously varying height. Further, the ends of the removed member may be exposed at the corner portions, adversely affecting the external appearance of the molding.

To overcome these drawbacks, Japanese Patent Laid-Open Publication No. 269612/1989 proposes an extruded molding which is simple in the shape, having a large leg portion. The large leg portion is cut at the upper molding part so that the leg portion extends to a different height at the side molding part. A windshield receiving groove is formed by cutting the leg portion partially. Then, the molding is elastically reshaped so that the windshield receiving groove at the upper molding part and the groove at the side molding part can be aligned. At the side molding part, the leg portion serves as a wall, outside of which a water drain channel is defined.

The size of the water drain channel is varied according to a difference of height between the vehicle body panels and the upper surface of the windshield.

In the latter case, there are also some drawbacks. For example, part of the molding should extend over the upper surface of the windshield to a certain extent when considering variations in manufacturing precision or assembling work. In such a case, the more the molding extends over the windshield surface, the smaller the sectional area of the water drain channel.

SUMMARY OF THE INVENTION

It is therefore an object of this invention to provide a windshield molding which is suitable to form effective water drain channels along vehicle body panels.

According to a first aspect of the invention, there is provided an automobile windshield molding for sealing the space between a windshield and a periphery of a window opening of an automobile body panels, the molding comprising: a molding body including a pair of extruded side molding part and an extruded upper molding part integral with and extending between the side molding parts, each the molding part having an inward wing for covering a peripheral edge of the windshield, an outward wing for covering edges of the automobile body panels, and a leg portion extending downwardly from the inward and outward wings and to be inserted in the space between the windshield and the window opening, the leg portion having a foot extending therefrom to support the peripheral edge of the windshield and having a gradually increased height at the side molding; and a sub-molding member having an upright portion to be attached to the leg portion of the side molding part, and a protector for covering the side edge of the windshield so that the protector and the inward wing of the side molding part define a space for a water drain channel along the side edge of the windshield.

According to a second aspect of the invention, the sub-molding member is sandwiched between the inward wing and the leg portion of the side molding part.

With the foregoing arrangement, the side edges of the windshield are supported by the side molding part and the sub-molding member. The leg portion of the side molding part gradually increases its height according to a difference of height between the upper surface of the windshield and the vehicle body panels. The inward wing of the side molding part is raised from the windshield as the leg portion becomes higher, so that there is a space defined by the inward wing and the leg portion of the side molding part, and the protector of the sub-molding member.

DETAILED DESCRIPTION OF THE PREFERRED EMBODIMENTS

Figure 2:
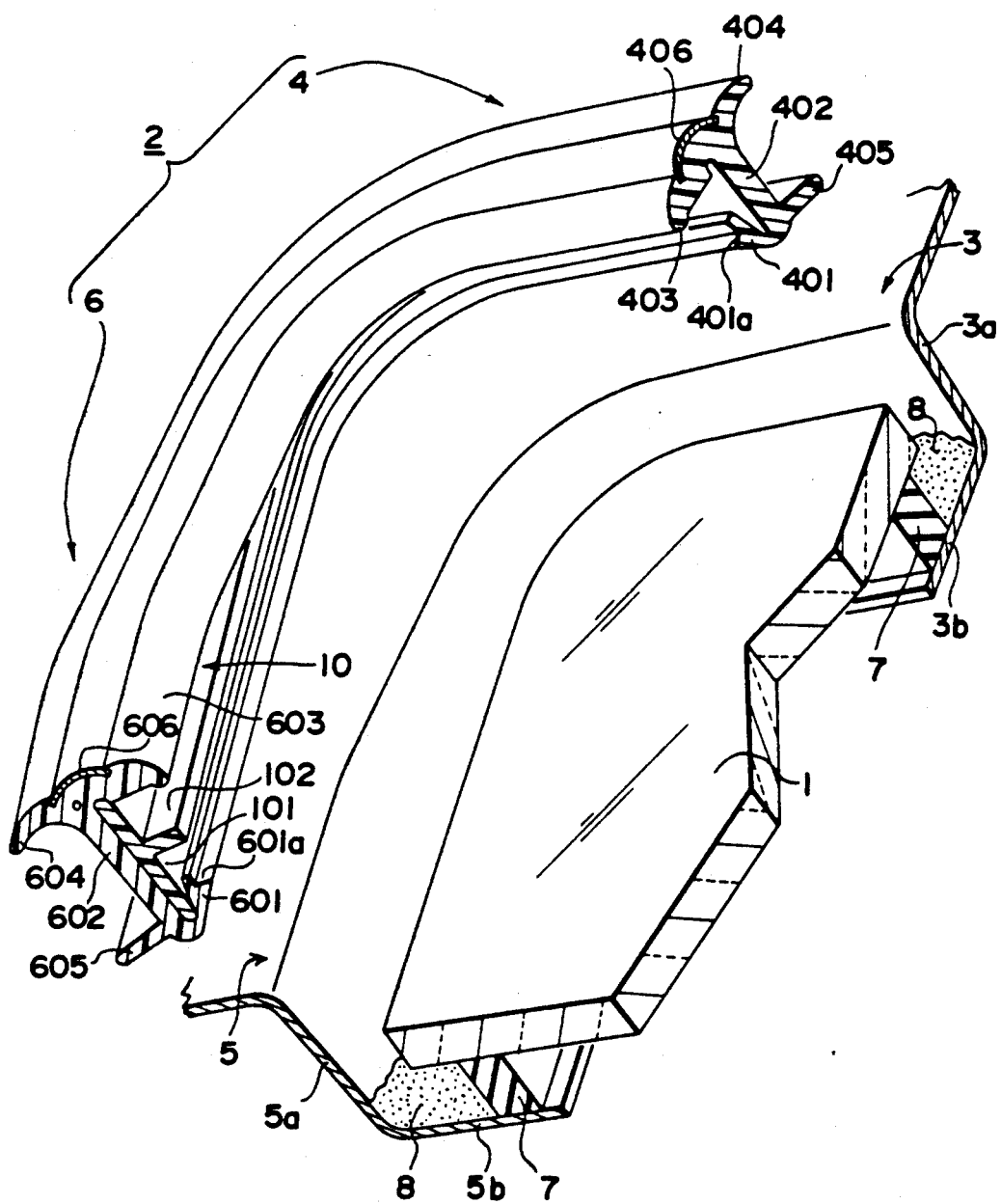
FIG. 2 is a perspective view, in exploded form, of a corner portion of a molding according to a first embodiment of this invention.
Figure 3:
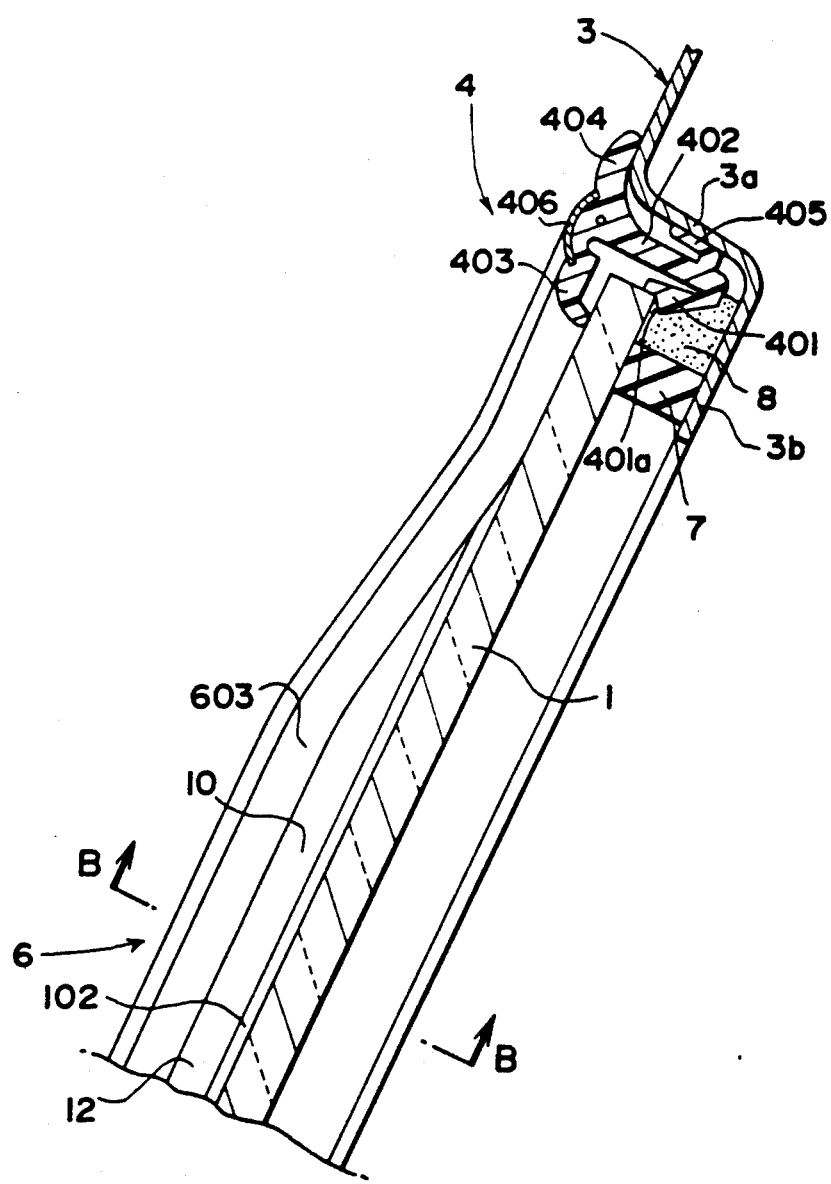
FIG. 3 is a cross-sectional view of the molding, taken along line 3—3 of FIG. 1.
Figure 4:
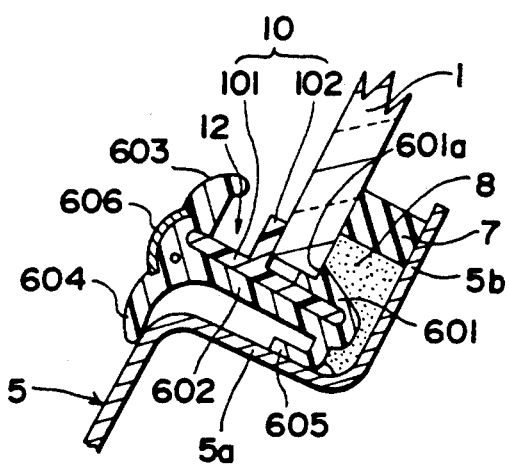
FIG. 4 is a cross-sectional view, taken along line 4—4 of FIG. 3.

A molding according to a first embodiment of this invention is shown in FIG. 2 to FIG. 4.

Figure 1:
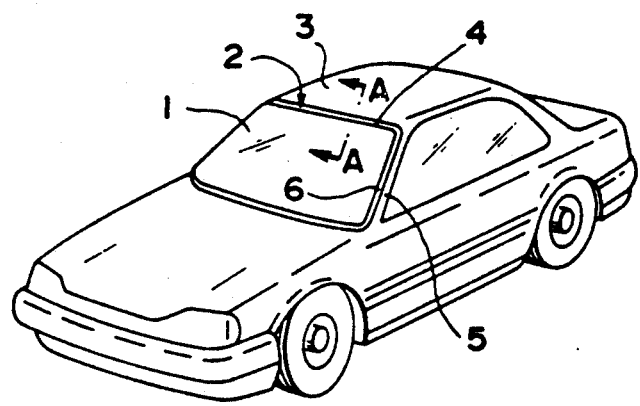
FIG. 1 is a front perspective view of a motor vehicle having a molding.

As shown in FIG. 1, the molding is installed to seal the space between windshield 1 and a periphery of a window opening of vehicle body panels. The molding is in the shape of strip, comprising a molding body 2 and sub-molding members 10. The molding body 2 includes a pair of extruded side molding parts 6 and an extruded upper molding part 4 integral with and extending between the side molding parts. The upper molding part 4 is installed between the upper edge of a windshield 1 and a roof panel 3, and each side molding part 6 is installed between each side edge of the windshield 1 and a pillar panel 5. The molding body 2 has a substantially uniform cross-sectional profile.

The upper molding part 4 is directly attached to the roof panel 3, while the side molding parts 6 are attached to the pillar panels 5 via the sub-molding member, not shown.

As shown in FIGS. 2 and 3, the roof panel 3 is folded to form an intermediate wall 3a and a flange 3b. The windshield 1 is placed on the flange 3b via a dam rubber 7, so that the upper edge of the windshield 1 confronts the intermediate wall 3a with a space between them. An adhesive 8 is filled in a space defined by the windshield 1, intermediate wall 3a, and flange 3b to fasten these members firmly.

The upper molding part 4 is inserted in the space defined by the upper edge of the windshield 1 and the intermediate wall 3a of the roof panel 3. The upper molding part 4 includes an inward wing 403, and outward wing 404, and a leg portion 402 extending downwardly from the inward and outward wings 403, 404. The leg portion 402 is contacted with the upper edge of the windshield 1, terminating in a foot 401 to contact with the lower edge of the windshield 1, and a flexible lip 405. The inward and outward wings 403, 404 are in the shape of a lip, respectively sealing the upper peripheral edge of the windshield 1, and a space between the roof panel 3 and the upper molding part 4.

The foot 401 is in the shape of hook having a step 401a, which is in contact with the lower edge of the windshield 1 as shown in FIG. 3. The flexible lip 405 is folded to be in flexible contact with the intermediate wall 3a of the roof panel 3. The flexible lip 405 assists to contact the step 401a of the foot 401 with the lower edge of the windshield 1, so that the upper molding part 4 is firmly attached to the roof panel 3.

The inward and outward wings 403, 404 are in pressure contact with the upper edge of the windshield 1 and the roof panel 3, respectively, sealing the space between the roof panel 3 and the windshield 1. An arcuate decorative member 406 is embedded at the border between the inward and outward wings 403, 404.

The pillar panel 5 is folded to form an intermediate wall 5a and a flange 5b similarly to the roof panel 3. The windshield 1 is placed on the flange 5b via the dam rubber 7, so that the side edge of the windshield 1 confronts the intermediate wall 5a with a space between them. The adhesive 8 is filled in a space defined by the windshield 1, intermediate wall 5a, and flange 5b to fasten these members firmly.

The side molding part 6 is installed in the space defined by the windshield 1 and the intermediate wall 5a of the pillar panel 5. The side molding part 6 includes the members 601, 601a, 602, 603, 604, 605, 606 identical to those of the upper molding part 4, and differs from the upper molding part 4 in that the side molding part 6 gradually increases its height according to a difference of height between the upper surface of the windshield 1 and the pillar panel 5. The side molding part 6 is installed in the space between the pillar panel 5 and the windshield 1 identically to the upper molding part 4.

The intermediate wall 5a of the pillar panel 5 gradually increases its height from an area near the corner of the window opening to the end of the pillar panel 5. The difference of height between the upper surface of the windshield 1 and the pillar panel 5 is also increased gradually. Therefore, the leg portion 602 of the side molding part 6 gradually becomes higher accordingly. The inward wing 603 is gradually spaced apart from the upper surface of the windshield 1, and extends over the windshield 1 with a certain space between them. More particularly, as shown in FIGS. 2 and 3, the spacing between inward wing 603 and the foot 601 (and thus also the spacing between inward wing 603 and windshield 1) gradually increases away from the corner of the side and upper parts 6, 4. By contrast, the shelf-like member 102 maintains a fixed spacing from the foot 601. The inward wing 403 is also maintained at a fixed spacing from the foot in the upper molding part 4. The space between the inward wing 603 and the upper surface of the windshield 1 is also gradually enlarged toward the end of the pillar panel 5.

Figure 5:
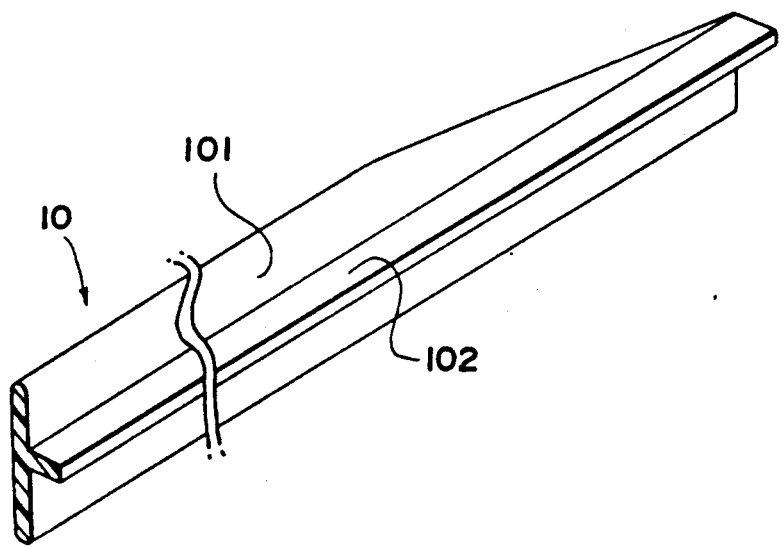
FIG. 5 is a cross-sectional and perspective view of a sub-molding member.

As shown in FIG. 5, the plate-like sub-molding member 10 is fastened to the leg portion 602 at the side confronting the side edge of the windshield 1. The sub-molding member 10 includes a flat body 101 and a shelf-like member 102 extending laterally from the flat body 101. The flat body 101 is fastened to one side of the leg portion 602 as described above. The lower edge of the flat body 101 is received in the hook-shaped foot 601, and the upper edge of the flat body 101 is fitted in a U-shaped groove on the lower surface of the inward wing 603 near the upper end of the leg portion 602.

The flat body 101 of the sub-molding member 10 gradually increases its height according to a varying height of the leg portion 602. The sub-molding member 10 is manufactured by the extrusion process to have a uniform shape. Unnecessary portions of the sub-molding member are then cut away. Otherwise, the member 10 is extruded according to its final shape.

The shelf-like protector 102 of the sub-molding member 10 is in pressure contact with the upper surface of the windshield 1 as shown in FIGS. 3 and 4. The side edge of the windshield 1 is supported by the shelf-like protector 101 and the foot 601 of the leg portion 602 of the side molding part 6.

A U-shaped space is defined between the lower surface of the inward wing 603, the upper part of the flat body 101, and the shelf-like member 102. The space serves as a water drain channel 12, which changes its width according to the height of the leg portion 602 of the side molding part 6. Two water drain channels 12 are formed along both the pillar panels 5, guiding fluid such as rain water to a specified position to prevent the fluid from being spread over the side windows.

The width of the water drain channel 12 is increased near the corner portion of the window opening in this embodiment. It is also possible to widen the water drain channel 12 gradually and continuously toward the end of the pillar panel 5.

Figure 6:
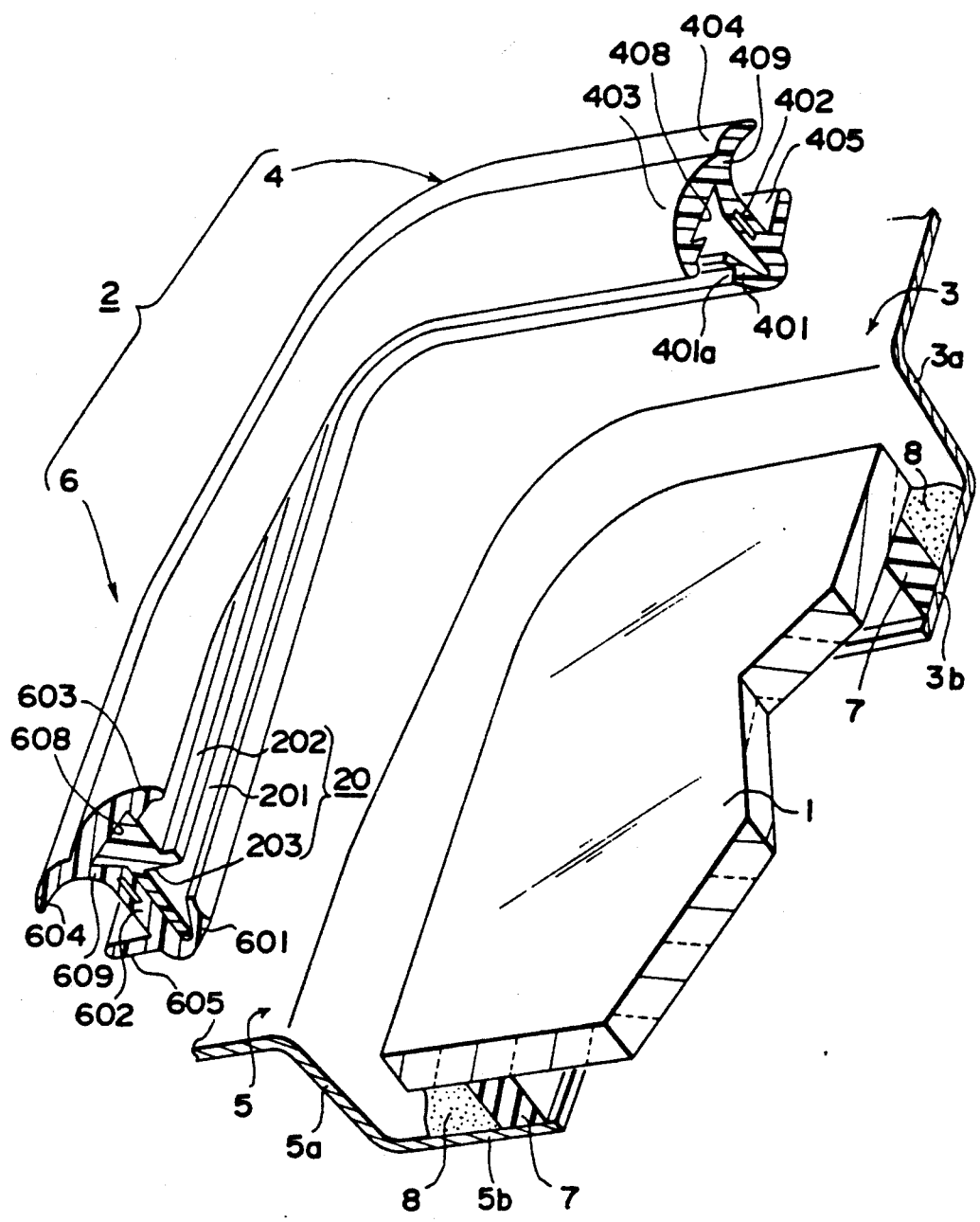
FIG. 6 is a perspective view, in exploded form, of a corner portion of a molding according to a second embodiment.
Figure 7:
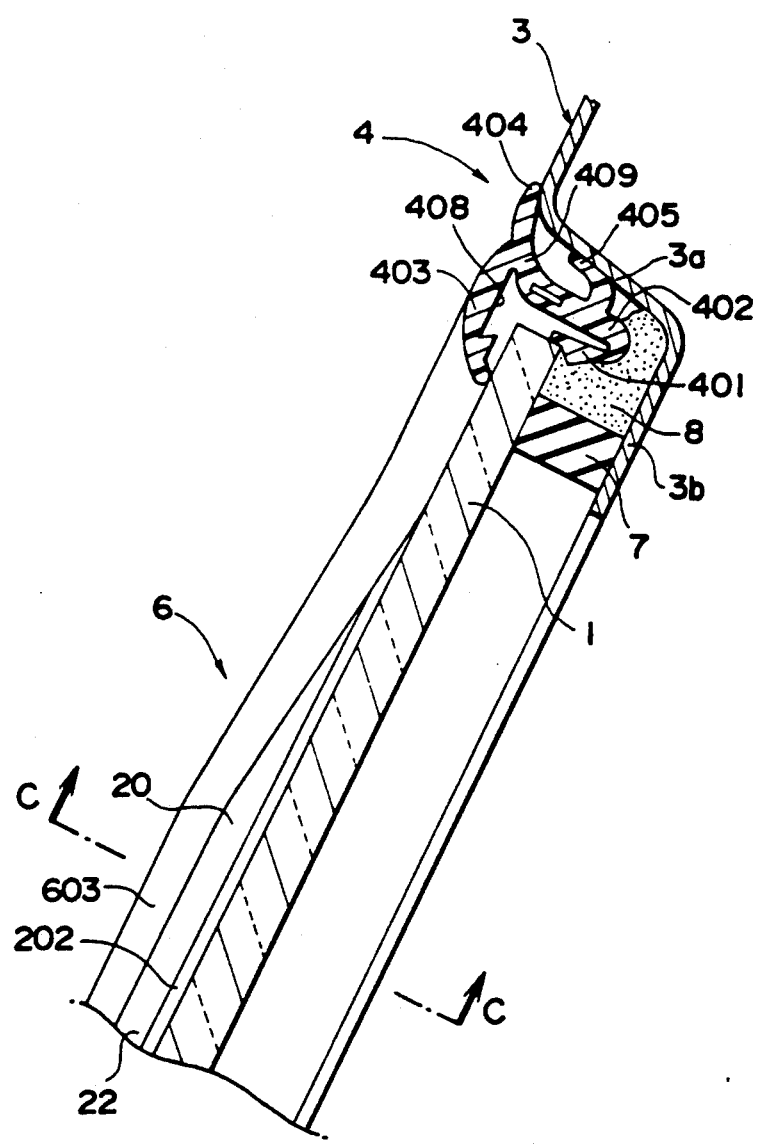
FIG. 7 is a cross-sectional view of the molding of FIG. 6 showing the cross-section of the upper molding part (i.e., as cross-sectioned in FIG. 6) in the assembled condition.
Figure 8:
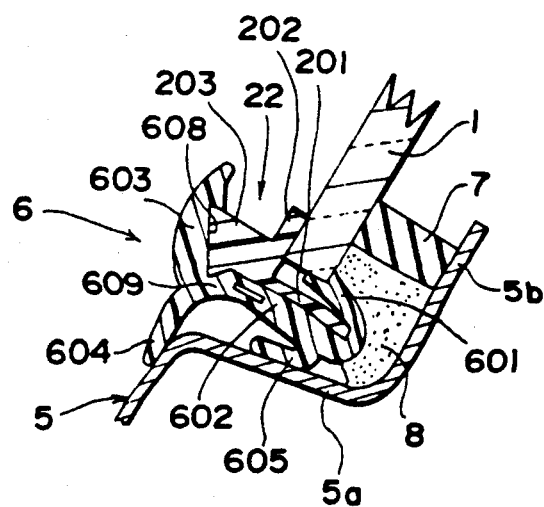
FIG. 8 is a cross-sectional view, taken along line 8—8 of FIG. 7.

FIGS. 6 to 8 show a molding according to a second embodiment of this invention. Like or corresponding parts are denoted by like or corresponding reference numbers similarly to the first embodiment.

An upper molding part 4 (and side molding part 6) has a dovetail groove 408 (608) on the lower surface of an inward wing 403 (603). The dovetail groove 408 (608) thins the upper end of a leg portion 402 (602) which extends downwardly from the inward wing 403 (603). The thinned end of the leg portion 402 (602) and the lower surface of the inward wing 403 (603) forms a notch 409 (609). When a sub-molding member 20 is fastened along the side molding part 6 and in the dovetail groove 608, the inward wing 603 is gradually raised to be apart from the upper surface of the windshield 1.

The sub-molding member 20 is in the shape of dovetail including a support 201, a reverse wedge member 203, and a shelf-like protector 202. The reverse wedge member 203 gradually increases its height as the leg portion 602 of the side molding part 6 increases the height toward the end of the pillar panel 5. The reverse wedge member 203 is fitted in the dovetail groove 608 of the inward wing 603, thereby raising the inward wing 603 from the upper surface of the windshield 1. The inward wing 603 and the shelf-like protector 202 defines a U-shaped space along the surface of the windshield 1. This space is used as a water drain channel 22. The width of the water drain channel 22 is increased as the reverse wedge member 203 becomes higher as described above.

The dovetail groove 409 of the inward wing 403 is formed only for overcoming an inconvenience caused during the extrusion process when the upper and side molding parts have different cross-sectional shapes. This dovetail groove 408 is dispensable in view of the strength of the inward wing 403. In such case, an opening for extruding that portion may be modified.

In the foregoing embodiments, the sub-molding members are installed only for the side molding parts. It is also possible to install the sub-molding member for the upper molding part.

Figure 9:
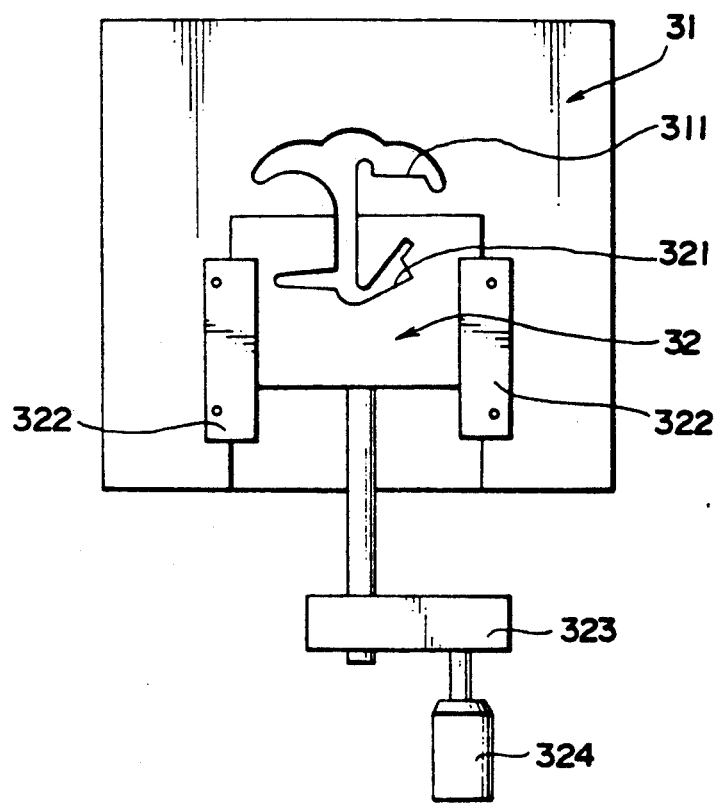
FIG. 9 is a front elevational view of a molding machine for manufacturing a main molding member.
Figure 10:
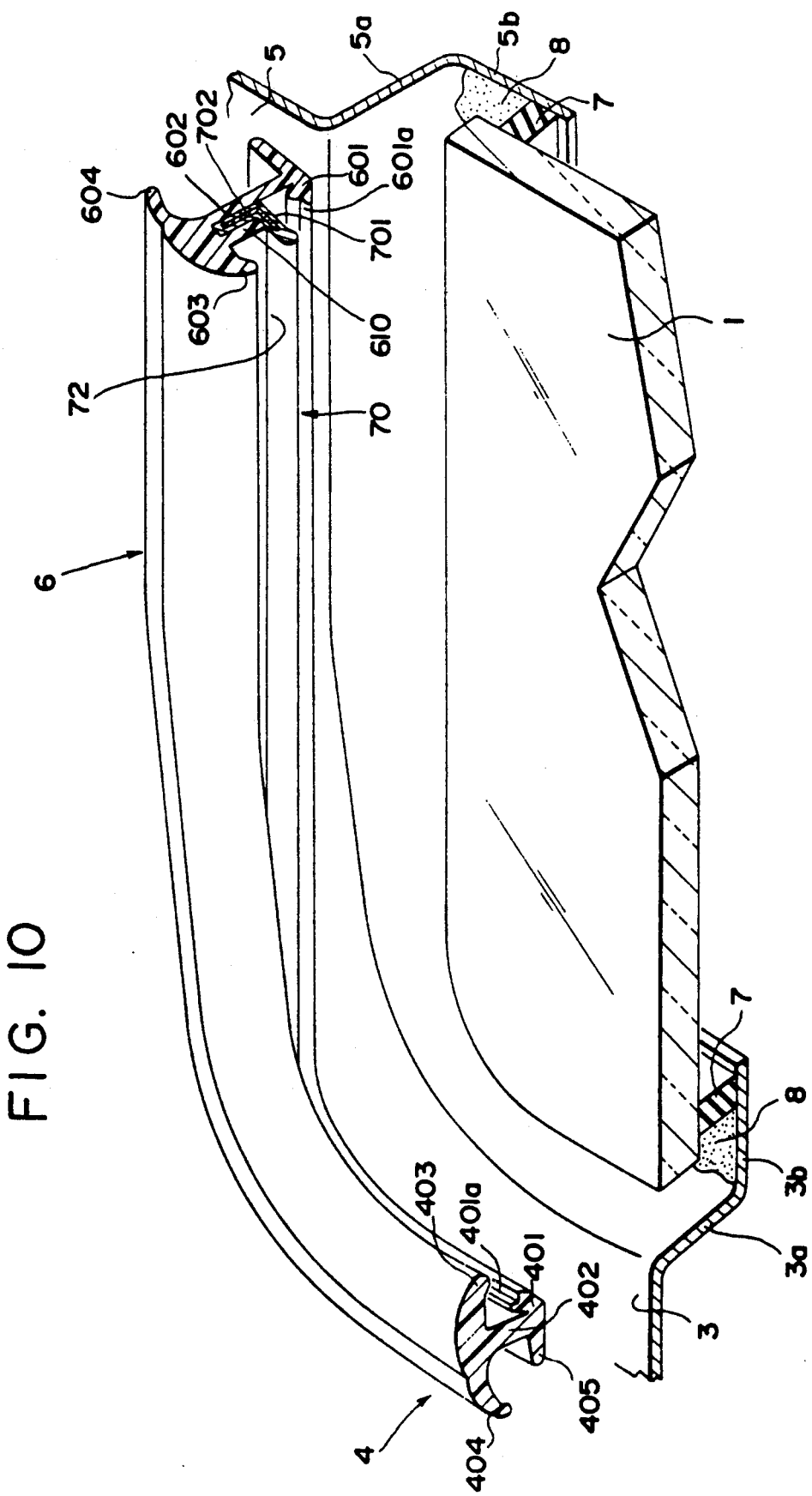
FIG. 10 is a cross-sectional and perspective view, in exploded form, of a corner portion of a molding according to a third embodiment.
Figure 11:
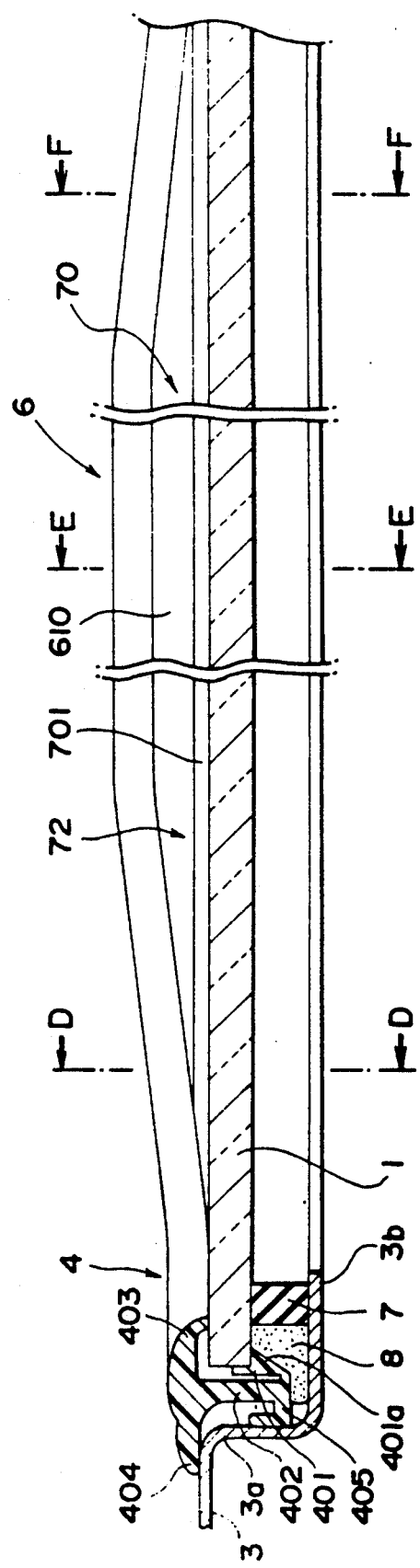
FIG. 11 is a cross-sectional view of the molding of FIG. 10, with the portions shown in cross-section also shown in cross-section in FIG. 10.
Figure 12:
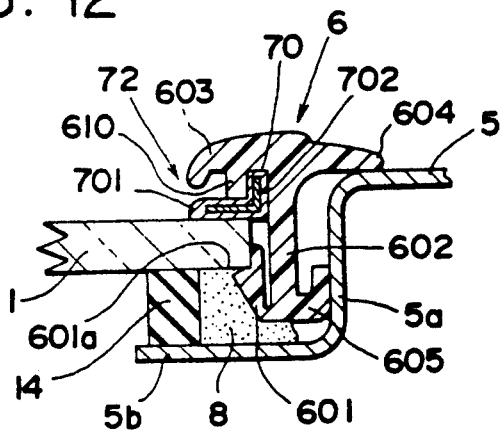
FIG. 12 is a cross-sectional view, taken along line 12—12 of FIG. 11.
Figure 13:
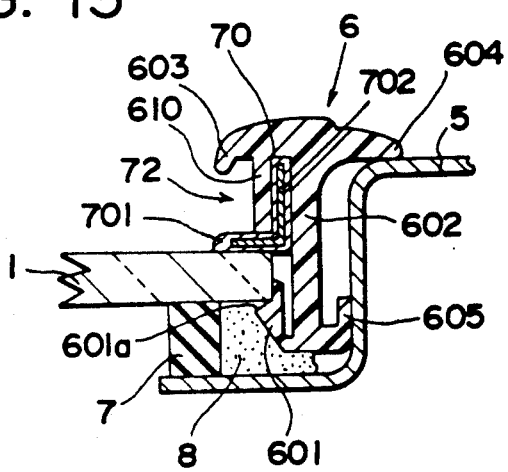
FIG. 13 is a cross-sectional view, taken along line 13—13 of FIG. 11.
Figure 14:
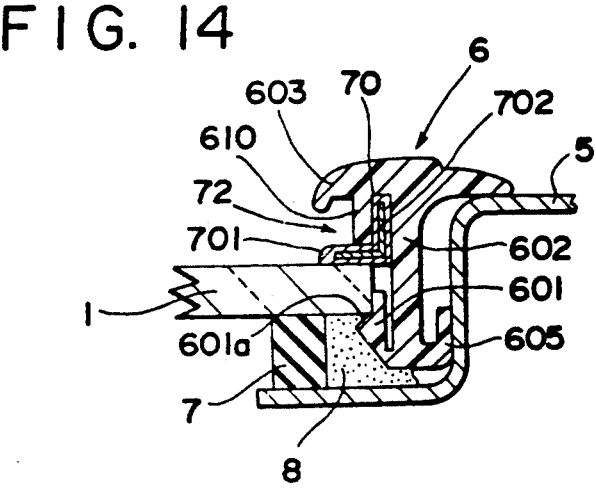
FIG. 14 is a cross-sectional view, taken along line 14—14 of FIG. 11.

A molding machine for manufacturing the molding of the first embodiment will be described with reference to FIG. 9. FIG. 9 shows the arrangement of dies.

The molding machine comprises a first die 31 and a second die 32 which are juxtaposed in the direction for extruding a molding (perpendicular to the plane of FIG. 9). The first die 31 is stationary, and the second die 32 is placed in front of the first die 31 to be parallel movable to and from the first die 31. The first die 31 includes an opening 311 corresponding to the cross-sectional shape of the upper half of the moldings 4, 6, i.e. inward and outward wings (403, 404, 603, 604), and upper part of the leg portion (402, 602). The second die 32 includes an opening 321 corresponding to the cross-sectional shape of the lower half of the molding, i.e. the leg portion (402, 602), the foot (401, 601), and the flexible lip (405, 605).

The second die 32 is supported by a pair of guides 322 to be movable in parallel, being connected to an output shaft of a motor 324 via a converter 323.

In operation, when the motor 324 is set in motion, the position of the second die 32 is adjusted for the first die 31 to extrude moldings 4, 6 in the strip shape.

A molding according to a third embodiment is shown in FIGS. 10 to 14. In this embodiment, the leg portion 602 is highest at the center of the side molding part 6, then being gradually lowered toward the end of the side molding part 6. A water drain channel 72 is also provided.

From the corner to side molding parts, a wall 610 gradually extends downwardly from the lower side of the inward wing 603. There is a preset space between the leg portion 602 and the wall 610. The wall 610 changes its height according to the varying height of the leg portion 602.

A sub-molding member 70 is inserted between the wall 610 and the leg portion 602. The sub-molding member 70 is a strip having an L-shaped cross section, including an upright portion 702 and a shelf-like protector 701. The upright portion 702 changes its height according to the height of the leg portion 602 of the side molding part 6. The shelf-like protector 701 is in contact with the upper surface of the windshield 1.

Figure 15:
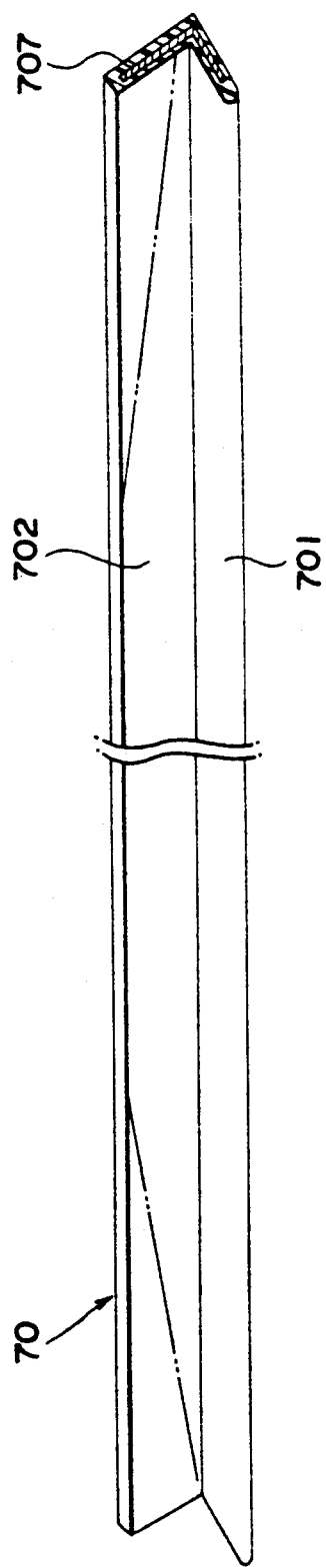
FIG. 15 is a perspective view of a sub-molding member for the molding of the third embodiment.
Figure 16:
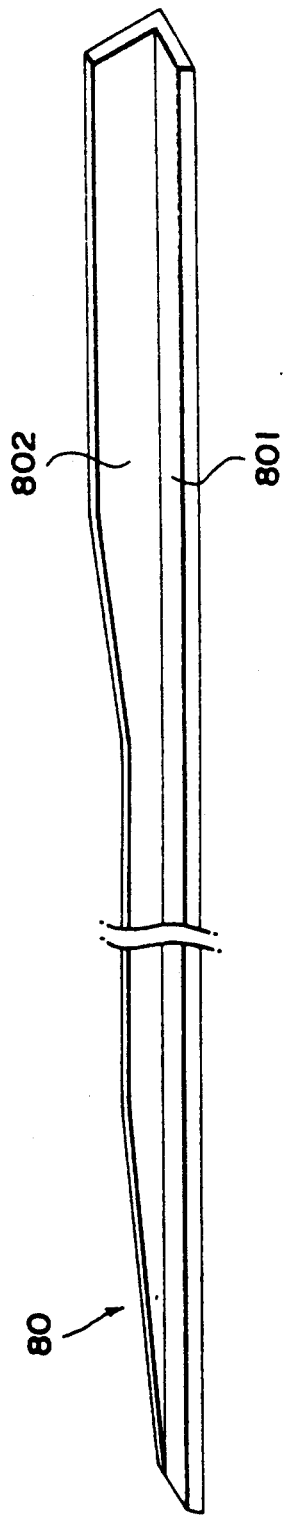
FIG. 16 is a perspective view of a modified sub-molding member for the molding of the fourth embodiment.

The sub-molding member 70 is shaped as shown in FIGS. 15 or 16. An L-shaped core metal 703 is covered with plastic material by the extrusion process, being cut according to the final shape of the sub-molding member 70 as shown by double-dash lines.

Figure 17:
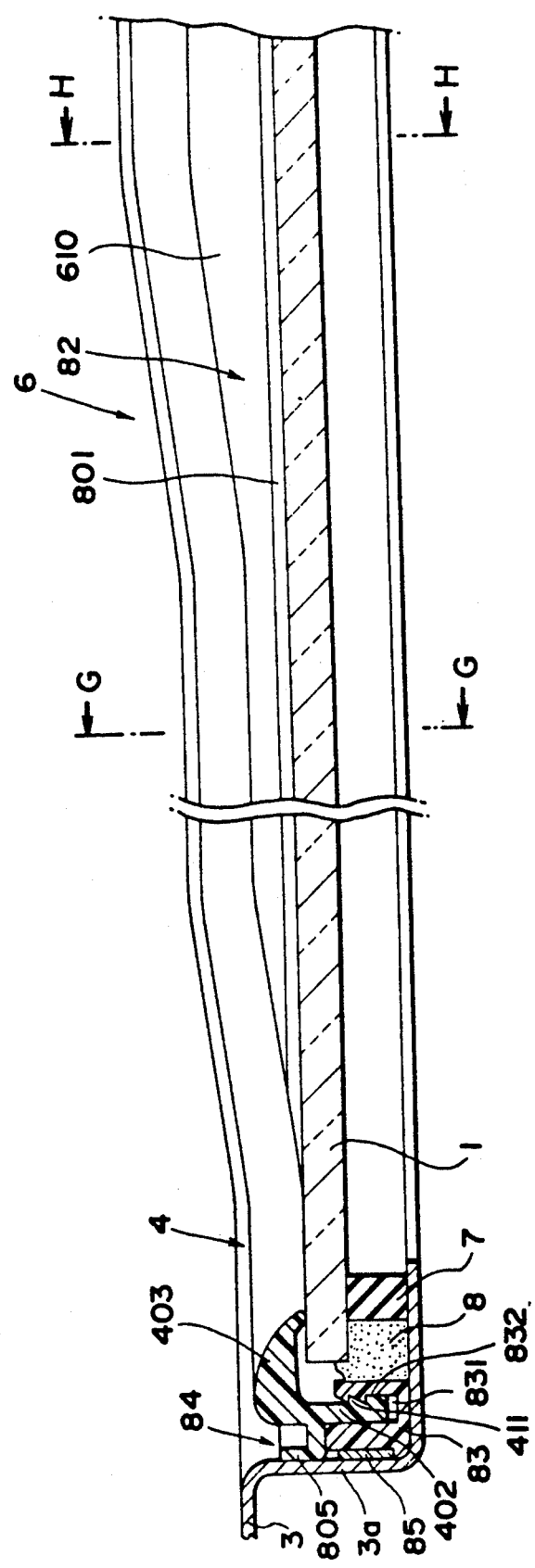
FIG. 17 is a perspective view, in exploded form, of a corner portion of a molding according to a fourth embodiment.
Figure 18:
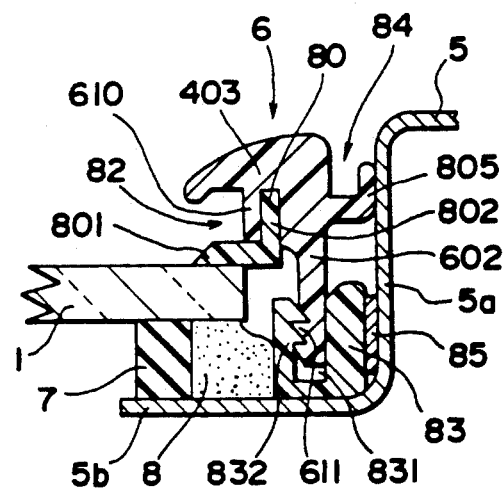
FIG. 18 is a cross-sectional view, taken along line 18—18 of FIG. 17.
Figure 19:
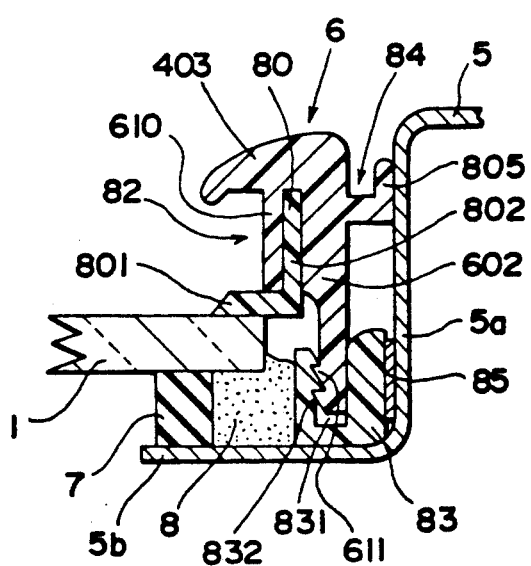
FIG. 19 is a cross-sectional view, taken along line 19—19 of FIG. 17.

In a fourth embodiment shown in FIGS. 17 to 19, a molding is attached to the vehicle body panels via a fastener. The fastener 83 is attached to the intermediate wall 3a (5a) of the vehicle body panel 3 (5) by a double adhesive tape 85. The fastener 83 is in the strip shape, having a U-shaped cross section. The leg portion 402 (602) of the molding 4 (6) is received in a space 831 of the fastener 83 with ribs 411 (611) of the leg portion 402 (602) engaged with a ribbed wall 832 of the fastener 83. A water drain channel is also provided as shown at 82. A channel 84 is also provided between the wing 403 and lip 805.

A sub-molding member 80 is inserted between the leg portion 602 and a wall 610 of the side molding part 6. The sub-molding member 80 is a strip having an L-shaped cross section, including an upright portion 802 and a shelf-like protector 801 extending from the upright portion 802. The shelf-like protector 801 is in contact with the upper surface of the windshield 1.

The plastic material is molded according to the final shape of the sub-molding member 80, so that the upright portion 802 is tapered as shown in FIG. 16.

Figure 20:
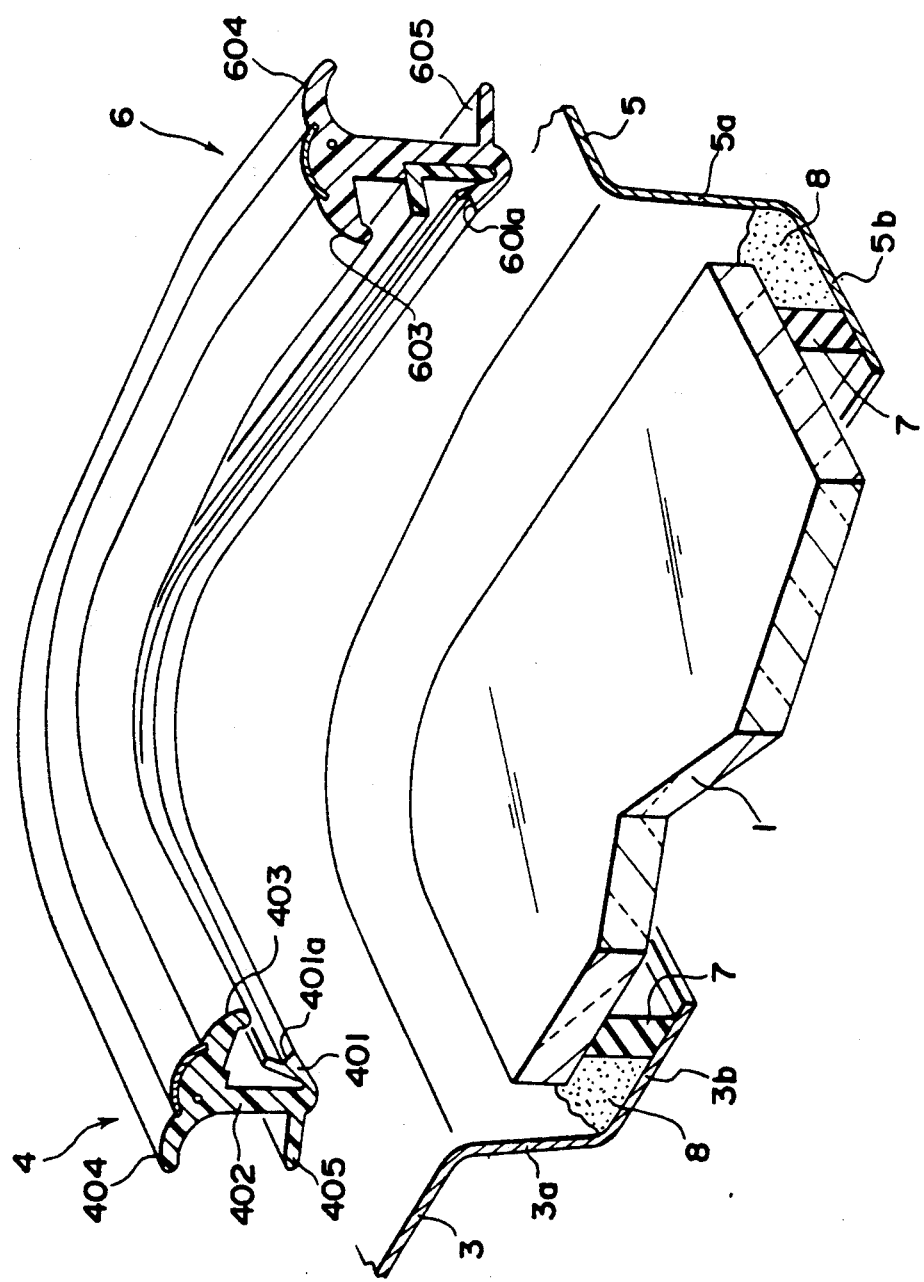
FIG. 20 is a perspective view, in exploded form, of a corner portion of a molding according to a fifth embodiment.
Figure 21:
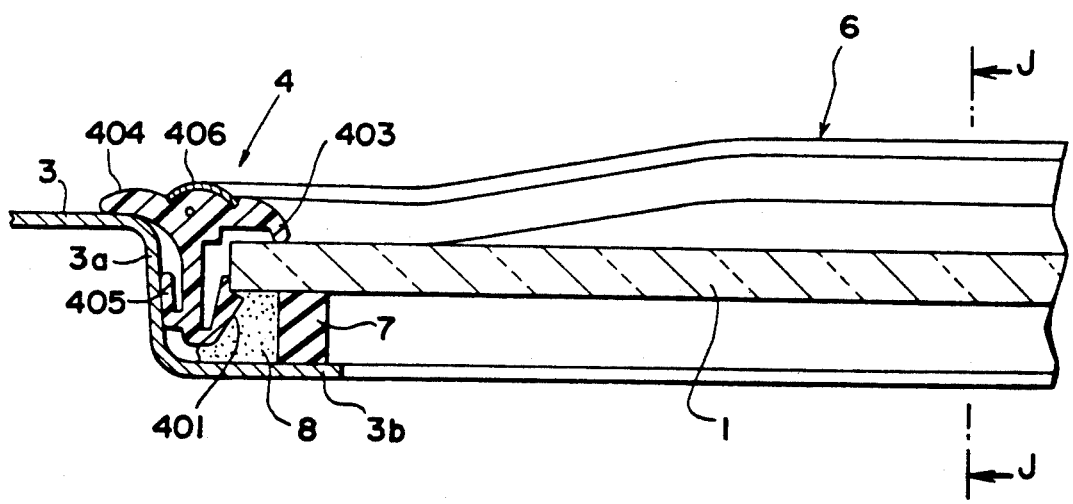
FIG. 21 is a cross-sectional view of the molding of FIG. 20, with the portions shown in cross-section also shown in cross-section in FIG. 20.
Figure 22:
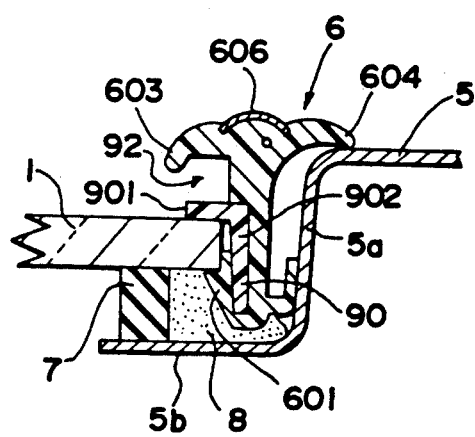
FIG. 22 is a cross-sectional view, taken along line 22—22 of FIG. 21.

With a fifth embodiment shown in FIGS. 20 to 22, the leg portion 602 of the side molding part 6 gradually increases its height toward the center of the side molding part 6, then keeps the height toward the end of the window opening. A sub-molding member 90 is inserted in the space between the side edge of the windshield 1 and the foot 601 of the side molding part 6. Specifically, the upright portion 902 of the sub-molding member 90 is in contact with one of the walls of the leg portion 602 of the side molding part 6. The shelf-like protector 901 of the sub-molding member 90 is in contact with the side edge of the windshield 1.

The leg portion 602 and the inward wing 603 of the side molding part 6 and the shelf-like protector 901 of the sub-molding member 90 define a space for a water drain channel 92.

What is claimed is:

1. An automobile windshield molding for sealing a space between a windshield and a periphery of a window opening of automobile panels, said molding comprising:
    (a) a molding body including an extruded side molding part and an extruded upper molding part integral with said side molding part, each said molding part having an inward wing for covering a peripheral edge of the windshield, an outward wing for covering edges of the automobile panels, and a leg portion extending downwardly from said inward and outward wings and to be inserted in the space between the windshield and the periphery of the window opening, said leg portion having a gradually increased height at said side molding part and having a foot extending therefrom at said side molding part such that a spacing between the inward wing of the side molding part and said foot gradually increases in said side molding part, and wherein a substantially constant spacing is provided between the inward wing in the upper molding part and a foot of the leg in the upper molding part; and
    (b) a sub-molding member having an upright portion to be attached to said leg portion of said side molding part, and a shelf-like protector for covering a side edge of the peripheral edge of the windshield so that said shelf-like protector and said inward wing of said side molding part define a space for a water drain channel along the side edge of the windshield and wherein a spacing between the shelf-like protector and the foot of the leg in the side molding part is substantially constant along the side molding part, and wherein said sub-molding member does not extend along the upper molding part.

2. An automobile windshield molding according to claim 1, wherein said sub-molding member is sandwiched between said inward wing and said leg portion of said side molding part.

* * * * *